June 29, 1954

B. E. LENEHAN 2,682,614

ELECTRORESPONSIVE THERMAL INSTRUMENT

Filed April 19, 1947

WITNESSES:
E. A. McCloskey
Nw. C. Groome

INVENTOR
Bernard E. Lenehan
BY C. L. Freedman
ATTORNEY

Patented June 29, 1954

2,682,614

UNITED STATES PATENT OFFICE 2,682,614

ELECTRORESPONSIVE THERMAL INSTRUMENT

Bernard E. Lenehan, Bloomfield, N. J., assignor to Westinghouse Electric Corporation, East Pittsburgh, Pa., a corporation of Pennsylvania Application April 19, 1947, Serial No. 742,692

26 Claims. (Cl. 307—43)

This invention relates to an electroresponsive thermal instrument, and it has particular relation to a thermal electric converter for measuring a function of the product of voltage and current such as watts or vars in an alternating current circuit.

It is well known in the art that the real or reactive power of an alternating power circuit may be measured by deriving two quantities which are proportional respectively to the vector sum and the vector difference of the voltage and current in the electrical circuit. These two quantities are employed for energizing a device having an output which is differentially responsive to the squares of two inputs. Measuring instruments of this type are described, for example, in the Lincoln Patent 1,156,412.

In accordance with the invention, two transformers are provided, each of which preferably has a magnetic core. Although two separate primary windings may be provided for each of the magnetic cores, preferably a first primary winding is provided which surrounds both of the magnetic cores and a separate second primary winding is provided for each of the magnetic cores. Conveniently the second primary windings may be connected to a common pair of terminals. The second primary windings are so poled that when the first primary winding and terminals are energized in accordance with the voltage and current of an alternating electrical circuit, the magnetic fluxes produced in the magnetic cores are proportioned respectively to the vector sum and the vector difference of the voltage and current of the associated electrical circuit.

Each of the magnetic cores is provided with a plurality of secondary windings, and each of the secondary windings conveniently may be connected to the heater of a separate thermocouple unit. The thermocouple units have their outputs connected in series, with the thermocouple units associated with the first one of the magnetic cores connected in opposition to the thermocouples associated with the second one of the magnetic cores. The resultant output of the thermocouple units is proportional to the power of the associated electrical circuit and may be employed for energizing a permanent-magnet, moving-coil instrument which is calibrated to indicate such power.

Thermocouple units are constructed from thermocouple conductors which generally are extremely small in diameter and the problem of securing the thermojunction of the thermocouple conductors to a heater has been difficult to solve with satisfaction.

In accordance with the invention, a heater of a thermocouple unit is constructed of the same material employed for the thermocouple conductors. In a preferred embodiment of the invention, a pair of thermocouple conductors are twisted at appropriate points to form thermojunctions. Successive thermojunctions are separated by a loop formed by the thermocouple conductors. By severing a first one of the thermocouple conductors in alternate loops, and by severing the second one of the thermocouple conductors in the remaining loops, the severed portions of the thermocouple conductors may be employed as heaters for the associated thermojunctions. Preferably the two thermocouple conductors have substantially equal electrical resistances.

It is, therefore, an object of the invention to provide an improved thermal electric converter.

It is a further object of the invention to provide a thermocouple unit wherein a heater is provided which is integral with the thermocouple conductors of the unit.

It is an additional object of the invention to provide a transformer unit for a thermal electric converter, wherein the transformer unit comprises a pair of magnetic cores having a first common primary winding associated with both magnetic cores and having an additional separate second primary winding for each of the magnetic cores.

It is a still further object of the invention to provide a transformer unit having a first group of secondary windings and a second group of secondary windings arranged for energization respectively in accordance with the vector sum and the vector difference of two alternating quantities, and to provide a thermal electric converter having separate heaters energized from each of the secondary windings.

It is an additional object of the invention to provide a method for constructing a thermocouple unit from two conductors by twisting the conductors at appropriate points and severing the conductors at appropriate points to provide a plurality of thermocouples and heaters constructed from the two conductors.

Other objects of the invention will be apparent from the following description, taken in conjunction with the accompanying drawing, in which.

Figure 1:
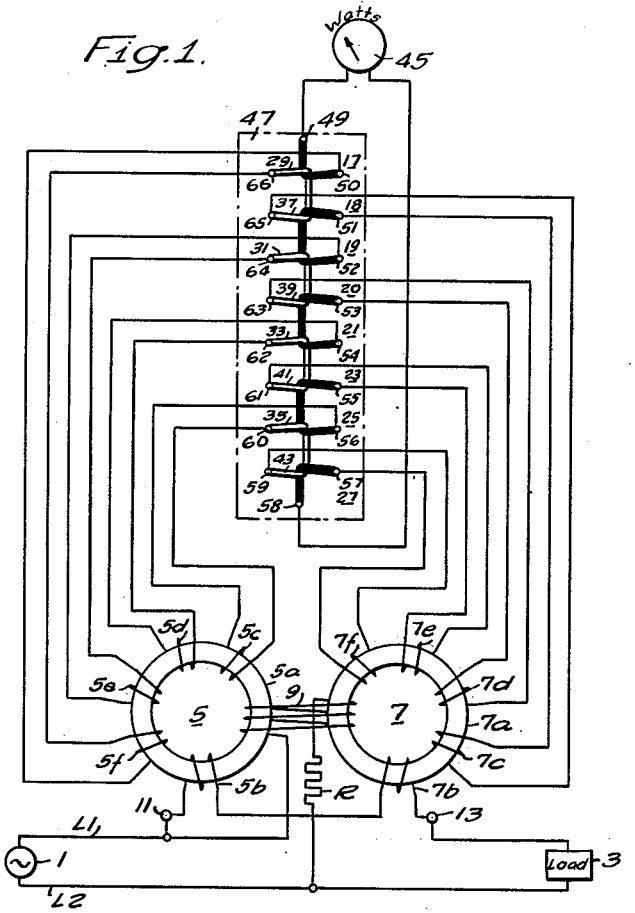
Figure 1 is a schematic view of a thermal electric converter unit embodying the invention.

Referring to the drawing, Fig. 1 shows an electrical circuit. This circuit may be either a single phase or a polyphase circuit and may be designed for operation at any desired frequency. For the purpose of discussion it will be assumed that the circuit is a single phase circuit represented by the conductors L1 and L2 which are energized from a source 1 of alternating electrical energy having a frequency of 60 cycles per second. The conductors L1 and L2 are employed for conducting electrical energy to a suitable load 3.

In order to measure the power supplied from the source 1 to the load 3, a pair of transformers 5 and 7 are associated with the electrical circuit; these transformers preferably having magnetic cores 5a and 7a which are constructed of a magnetic material having high permeability and low losses, such as that described in the Yensen Patent 1,807,021.

The magnetic cores 5a and 7a have primary windings associated therewith for the purpose of producing magnetic fluxes in the magnetic cores which correspond respectively to the vector sum and the vector difference of the voltage and current of the associated electrical circuit. Although each of the magnetic cores may be provided with two independent primary windings, preferably a first primary winding 9 is provided which is common to the two magnetic cores. In addition, each of the magnetic cores is provided with a separate second primary winding 5b and 7b which are connected in parallel or series to two terminals 11 and 13. In the preferred embodiment illustrated in Fig. 1, the secondary windings 5b and 7b are connected in series to the two terminals 11 and 13.

The primary winding 9 may be designed to provide a desired value of resistance. For the purpose of illustration a separate resistor R is shown in series with the winding 9. Adjustment of the unit may be facilitated by utilization of a resistor R having an adjustable value of resistance.

If the primary winding 9 is energized in accordance with current flowing in the associated electrical circuit, the windings 5b and 7b would be connected for energization in accordance with the voltage of the associated electrical circuit. However, for the purpose of discussion, it will be assumed that the primary winding 9 is connected across the conductors L1 and L2 for energization in accordance with the voltage across such conductors. The terminals 11 and 13 are disposed in the conductor L1 for the purpose of energizing the windings 5b and 7b in accordance with current supplied by the source 1 to the load 3. The windings 5b and 7b are so poled with respect to the terminals 11 and 13 that the cores 5a and 7a are energized respectively in accordance with the vector sum and the vector difference of voltage and current flowing in the associated electric circuit L1 and L2.

Each of the magnetic cores is provided with any desired number of secondary windings. In the embodiment of Fig. 1, the magnetic core 5a is provided with four secondary windings 5c, 5d, 5e and 5f. Similarly, the magnetic core 7a is provided with secondary windings 7c, 7d, 7e and 7f.

The secondary windings are associated with the heaters of eight thermoresponsive or thermocouple units 17, 18, 19, 20, 21, 23, 25 and 27. For example, the thermocouple unit 17 has a heater 29 connected for energization from the secondary winding 5f. In a similar manner, the thermocouple units 19, 21 and 25 have heaters 31, 33 and 35 connected for energization respectively from the secondary windings 5e, 5a and 5c.

The thermocouple unit 18 has a heater 37 connected for energization from the secondary winding 7c. In a similar manner, the thermocouple units 20, 23 and 27 have heaters 39, 41 and 43 connected respectively for energization from the secondary windings 7d, 7e and 7f.

The thermocouple units have their outputs connected in a series circuit for the purpose of energizing a suitable measuring instrument 45. The thermocouples 17, 19, 21 and 25 have their outputs connected in opposition to the outputs of the remaining thermocouple units for the purpose of energizing the measuring instruments 45 in accordance with power flowing in the circuit represented by the conductors L1 and L2. Although the measuring instrument 45 may represent any suitable translating device, conveniently it may take the form of a permanent-magnet, moving-coil instrument which is calibrated in terms of the power to be indicated thereby.

As previously pointed out, thermocouple conductors are quite difficult to handle. In accordance with a preferred embodiment of the invention, the thermocouple units of Fig. 1 may be constructed by a procedure which is in part illustrated in Fig. 2.

Figure 2:
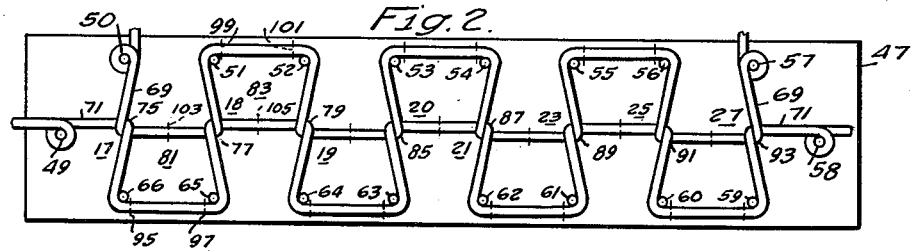
Fig. 2 is a view in top plan, showing a thermocouple unit at one stage in its construction in accordance with the invention.

Referring to Fig. 2, it will be observed that an insulating panel 47 is provided with a plurality of electroconductive terminals 49 to 66. Two thermocouple conductors 69 and 71 are provided which have the requisite properties for forming suitable thermojunctions. For example, the thermocouple conductors may be constructed of alloys known as "advance" and "manganin." Other thermocouple alloys may be employed, but it is desirable that the alloys selected for the two thermocouple conductors have the same electrical resistivity.

As shown in Fig. 2, the two conductors 71 and 69 are connected respectively to the terminals 49 and 50 in any suitable manner as by brazing or welding. The two conductors are then twisted to form a thermojunction 75. One of the conductors 71 next is guided around the two terminals 66 and 65 and the conductors are again twisted to form a second thermojunction 77. The conductor 69 now is guided around the two terminals 51 and 52, following which the conductors are twisted to form a third thermojunction 79. It will be noted that these operations result in the formation of loops 81 and 83. In a similar manner, the conductors are guided and twisted to provide additional thermojunctions 85, 87, 89, 91 and 93. Finally the free ends of the conductors 69 and 71 are secured respectively to the terminals 57 and 58.

Preferably the two conductors at each of the thermojunctions are secured to each other in a suitable manner as by welding or brazing. In addition, each of the conductors is secured to each of the terminals about which it passes in a suitable manner as by welding or brazing. Finally each of the loops formed by the two conductors has a portion of one of the conductors intermediate the two associated terminals severed or removed. For example, the conductor 71 intermediate the two terminals 65 and 66 is severed along the dotted lines 95 and 97. Similarly, the conductor 69 intermediate the two terminal 51 and 52 is severed along the dotted lines 99 and 101. In an analogous manner, each of the loops has a portion severed to produce a thermocouple unit similar to that illustrated in Fig. 1.

The portions of each of the thermocouple conductors 69 and 71 directly connecting each pair of terminals, such as the terminals 50 and 66, constitute a heater for the associated thermojunction, such as the thermojunction 75. Although the thermojunction preferably is located equidistant from the two associated terminals, a slight deviation from the mid-position is permissible, particularly if the two conductors 69 and 71 have substantially the same electrical resistivity.

The portions of the thermocouple conductors 69 and 71 which directly connect the terminals 49 and 58, constitute eight thermocouples which are connected in series between the two terminals. For example, the portions of the thermocouple conductors which project from the thermojunction 75 to the terminal 49 and to a dotted line 103 constitute a first thermocouple which is heated by the heater extending between the terminals 50 and 66. The dotted line 103 is equi-distant from the thermojunctions 75 and 77. In an analogous manner, the portions of the conductors 69 and 71 which extend from the thermojunction 77 to the dotted line 103 and to a dotted line 105 constitute a second thermocouple which is heated by the heater connected between the terminals 51 and 65.

A study of Fig. 2 shows that the thermocouples associated with the thermojunctions 75, 79, 87 and 91 have similar polarities which are opposed to the polarities of the thermocouples associated with the thermojunctions 77, 85, 89 and 93. Consequently, if the instrument 45 is connected to the terminals 49 and 58 it will measure the difference between the outputs of the thermocouples associated with the thermojunctions 75, 79, 87 and 91 and the outputs of the thermocouples associated with the thermojunctions 77, 85, 89 and 93.

Figure 3:
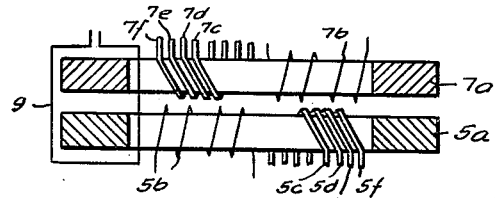
Fig. 3 is a view in sectional elevation with parts schematically shown of a transformer unit suitable for the system illustrated in Fig. 1.

It will be recalled that the magnetic cores 5a and 7a have a plurality of windings associated therewith. These windings may be associated with the magnetic cores in a manner illustrated in Fig. 3. As shown in Fig. 3, the winding 5b is wound about the magnetic core 5a. Also a cable having four conductors is wound around the magnetic core 5a to provide the four secondary windings 5c, 5d, 5e and 5f. It will be understood that the cable may have as many conductors as are required for the desired number of secondary windings.

In a similar manner, the winding 7b is associated with the magnetic core 7a and a cable having the desired number of conductors is wound about the magnetic core 7a to provide the secondary windings 7c, 7d, 7e and 7f. The magnetic cores 5a and 7a next are mounted in alignment but reversed with respect to each other. The winding 9 then is wound about both of the magnetic cores to complete the desired transformer assembly. It should be clear that the windings may have as many turns as desired.

The transformers 5 and 7 not only may replace the voltage and current transformers ordinarily employed with electrical circuits, but they also provide as many secondary circuits as desired, each having an output proportional to the sum of or difference between the voltage and current of the associated electrical circuit. Furthermore, by constructing the magnetic cores 5a and 7a to saturate at a suitable primary energization thereof, overload protection is afforded the thermocouple units or other devices associated therewith. For example, the transformer cores may be designed to saturate when they deliver secondary currents equal to three times the full load current rating of the heaters.

Although the invention has been described with respect to certain specific embodiments thereof, numerous modifications are possible. Therefore, the appended claims are to be construed to cover not only the specific embodiments herein illustrated, but all other embodiments which fall within the spirit and scope of the invention as defined by the claims.

I claim as my invention:

1. In an electroresponsive system, a pair of electrical transformers having primary and secondary windings, means effective when energized by two alternating quantities for inducing in the transformers through the primary windings magnetic fluxes proportional respectively to the vector sum and the vector difference of the alternating quantities, an electroresponsive device having an output proportional to the difference between the squares of two inputs thereto, and connections between the secondary windings of the transformers and the electroresponsive device for supplying to the electroresponsive device as said two inputs a pair of energizations corresponding respectively to said magnetic fluxes, said transformers have magnetic cores designed to saturate for the purpose of limiting the inputs to the electroresponsive device to values which cannot damage the electroresponsive device.

2. In an electroresponsive system, a pair of transformers comprising first primary winding means effective when energized from a first alternating source for producing a first alternating magnetic flux in each of said transformers, a separate second primary winding associated with each of said transformers for producing when energized from a second alternating source a second alternating magnetic flux in each of the transformers, said second primary windings being poled relative to the first primary winding means to produce resultant magnetic fluxes in the transformers which are proportional respectively to the vector sum and the vector difference of the first and second alternating magnetic fluxes, each of the transformers including secondary winding means having a voltage induced therein which is proportional to the associated resultant magnetic flux, an electroresponsive device having an output proportional to the difference between the squares of two inputs thereto, and connections for supplying the two inputs to said electroresponsive device respectively from said two secondary winding means, said transformer having magnetic cores designed to saturate for the purpose of limiting the inputs to the effective range of the device.

3. A system as claimed in claim 2 wherein said transformers have magnetic cores, and wherein said primary winding means comprises a single winding linked with both of the magnetic cores.

4. In a thermal converter system, a pair of thermoresponsive devices, a first transformer having a secondary winding connected to energize a first one of the thermoresponsive devices, a second transformer having a secondary winding connected to energize a second one of the thermoresponsive devices, said transformers having primary windings connecting each of the transformers for energization from two sets of terminals for energizing the transformers respectively in accordance with the vector sum and the vector difference of two alternating quantities supplied to said terminals, said transformers having magnetic cores designed to saturate for the purpose of limiting the energization of the thermoresponsive devices to the overload rating of the thermoresponsive devices.

5. In an electroresponsive device, a pair of magnetic cores, a first primary winding surrounding both of the magnetic cores, a separate second primary winding for each of the magnetic cores, a pair of terminals connected to said second primary windings, said second primary windings being so poled that when the first primary winding is energized in accordance with a first alternating quantity and the second primary windings are energized through the pair of terminals in accordance with a second alternating quantity, the magnetic cores carry magnetic fluxes proportional respectively to the vector sum and the vector difference of the quantities, a plurality of secondary windings for each of said magnetic cores, a plurality of thermoresponsive units each connected for energization from a separate one of the secondary windings, and translating means responsive to the difference between the outputs of the thermoresponsive units associated with a first one of the magnetic cores and the outputs of the thermoresponsive units associated with a second one of the magnetic cores.

6. In a thermal converter system, a pair of magnetic cores, primary winding means for directing magnetic flux through said magnetic cores in accordance with the voltage of an alternating current circuit, primary winding means for directing magnetic flux through said magnetic cores in accordance with the current of an associated alternating current circuit, said primary winding means being poled to provide resultant magnetic fluxes in the two magnetic cores which represent respectively the vector sum and the vector difference of voltage and current in electrical circuit to which the converter system is connected, a plurality of secondary windings for each of said magnetic cores, a plurality of thermoresponsive units, each of said units being connected for energization from a separate one of the secondary windings, and means connecting the outputs of the thermoresponsive units in series, the outputs of the thermoresponsive units associated with one of said magnetic cores being connected in opposition to the outputs of the thermoresponsive units associated with the other of said magnetic cores to produce a resultant output.

7. A thermal converter system as defined in claim 6 wherein said magnetic cores are designed to saturate for the purpose of preventing overloading of the thermoresponsive units.

8. A thermoresponsive unit comprising a pair of conductors, each having a pair of arms united at a point to form a V, said conductors having substantially the same electrical resistivity and being integrally constructed of dissimilar materials capable of forming a thermojunction when in engagement, and means securing the conductors with the points thereof in engagement, each of said V's having a first arm projecting from the engaged points to constitute an arm of a thermocouple, and each of the V's having a second arm projecting from the engaged points to constitute a portion of a heater for the thermocouple, the V's being interlinked.

9. In a thermoresponsive unit, a pair of spaced first electroconductive members, a second electroconductive member having a separate end engaging each of the first electroconductive members to form a junction, said first and second electroconductive members being formed of dissimilar materials capable of forming a thermojunction when in contact, whereby each of the junctions constitutes a thermojunction, and a separate heater for each of the thermojunctions, each of the heaters comprising portions integrally joined to the electroconductive members.

10. A thermoresponsive unit as claimed in claim 9 wherein said first and second electroconductive members and the heaters associated therewith have substantially the same electrical resistivity.

11. In a thermoresponsive unit, a plurality of first electroconductive members, a plurality of second electroconductive members, said members being disposed in a row wherein the first and second electroconductive members alternate and wherein the adjacent ends of each pair of adjacent members are in engagement to form a junction, said first and second electroconductive members being formed of dissimilar materials capable of forming a thermojunction when in engagement, whereby the junction between each pair of adjacent members is a thermojunction, and a separate heater for each of the thermojunctions.

12. A thermoresponsive unit as claimed in claim 11, wherein each heater comprises projections of the electroconductive members from the associated thermojunctions.

13. The method of constructing a thermoresponsive unit from a pair of dissimilar conductors capable of forming a thermojunction when in contact, which comprises engaging said conductors at a plurality of spaced points to form thermojunctions, subsequently dividing a first one of the conductors between each alternate pair of thermojunctions into two spaced portions, and dividing a second one of the conductors intermediate each of the remaining pairs of thermojunctions into two spaced portions.

14. The method of constructing a thermoresponsive unit from a pair of dissimilar conductors capable of forming a thermojunction when in contact, which comprises twisting said conductors together at a plurality of spaced points to form thermojunctions, each pair of successive thermojunctions being connected by portions of both of said conductors, subsequently dividing a first one of the conductors between each alternate pair of successive thermojunctions into two portions, and dividing a second one of the conductors between each remaining pair of successive thermojunctions into two portions.

15. The method of constructing a thermoresponsive unit from first and second dissimilar conductors capable of forming a thermojunction when in contact, which comprises connecting each of the conductors to a separate terminal, twisting the conductors about each other to form a first thermojunction, guiding the first conductor around a first pair of spaced terminals, twisting said conductors about each other to form a second thermojunction, said conductors intermediate said thermojunctions forming a first loop, guiding the second conductor around a second pair of spaced terminals, twisting the conductors about each other to form a third thermojunction, said conductors intermediate the second and third thermojunctions forming a second loop, severing the first conductor between the first pair of spaced terminals, and severing the second conductor between the second pair of spaced terminals.

16. The method of constructing a thermoresponsive unit from first and second dissimilar conductors capable of forming a thermojunction when in contact, which comprises connecting each of the conductors to a separate terminal, twisting the conductors about each other to form a first thermojunction, guiding the first conductor around a first pair of spaced terminals, twisting said conductors about each other to form a second thermojunction, said conductors intermediate said thermojunctions forming a first loop, guiding the second conductor around a second pair of spaced terminals, twisting the conductors about each other to form a third thermojunction, said conductors intermediate the second and third thermojunctions forming a second loop, continuing the guiding of the first conductor around spaced terminals, twisting of the conductors, guiding of the second conductor around spaced terminals and twisting to form as many alternate loops similar to the first and second loops as desired, connecting each free end of the conductors to a separate terminal, severing the first conductor between the first pair of spaced terminals, similarly severing the first conductor at each additional loop corresponding to the first loop, severing the second conductor between the second pair of spaced terminals, and similarly severing the second conductor at each additional loop corresponding to the second loop.

17. In a converter system, a plurality of electroresponsive first units, a plurality of electroresponsive second units, each of said units having an output proportional to the square of an input thereto, translating means responsive to the difference between the outputs of the first and second units, transformer means including a plurality of first secondary windings and a plurality of second secondary windings, said transformer means including primary windings connected to induce in the first secondary windings and the second secondary windings voltages responsive, respectively, to the vector sum and vector difference of two alternating quantities, connections for energizing each of the first electroresponsive units in accordance with the output of a separate one of the first secondary windings, and connections for energizing each of the second electroresponsive units in accordance with the output of a separate one of the second secondary windings.

18. A system as defined in claim 17 wherein the electroresponsive units are subject to damage by overloading, said transformer means being designed to saturate for restricting the energizations of the electroresponsive units to values incapable of overloading the electroresponsive units.

19. A system as claimed in claim 17 wherein each of the electroresponsive units comprises a thermoresponsive device having a pair of terminals through which heating current is supplied thereto, said connections connecting each pair of said terminals to a separate one of the secondary windings for energization therefrom.

20. In apparatus of the class described, the combination of a plurality of thermocouple units, each of said units comprising a thermocouple element composed of two wires of dissimilar metals having end-to-end junction, and a heating element having direct heating contact therewith at said junction and extending substantially at right angles to both of said wires, isolating transformer windings for energizing said heating elements in conductively isolated relation, said thermocouple elements being connected in series opposing, and an output circuit fed from said thermocouple elements.

21. In apparatus of the class described, the combination of a plurality of thermocouple units, each of said units comprising a thermocouple element and a heating element having direct heating contact therewith, isolating transformer windings for supplying alternating current to said heating elements in conductively isolated relation, said thermocouple elements being connected in series opposing pairs, and a direct current output circuit leading from said thermocouple elements.

22. In apparatus of the class described, the combination of a plurality of thermocouple units, each of said units comprising a thermocouple junction composed of two wires of dissimilar metals in end-to-end abutment and a heating element having direct heating contact with said junction and extending substantially at right angles to both wires, and isolating transformer windings for energizing different heating elements proportionate to different electrical functions being measured, said thermocouple elements being connected in series opposing pairs, and a direct current output circuit feed from said thermocouple elements.

23. In apparatus of the class described for measuring power transmitted over an alternating current line to load apparatus, the combination of a plurality of thermocouple units, each of said units comprising a thermocouple element and a heating element having direct heating contact therewith, isolating transformer secondaries for energizing the heating element of one thermocouple unit proportionate to one function of a load current transmitted over said alternating current line to said load apparatus and for energizing the heating element of another thermocouple unit proportionate to another function of said load current, and an output circuit connecting with said thermocouple elements in opposition.

24. In apparatus of the class described, the combination of a plurality of thermocouple units, each of said units comprising a thermocouple element and a heating element having direct heating contact therewith, isolating transformer windings for supplying alternating current to said heating elements in conductively isolated relation, and a direct current output circuit leading from said thermocouple elements, in each of said thermocouple units said thermocouple element and said heating element having direct heat transmitting contact at one point only and having the thermocouple element extending substantially at right angles to the heating element, whereby to prevent or minimize the transfer of an alternating current component from the alternating current circuit of the heating element to the direct current circuit of the thermocouple element.

25. In apparatus of the class described, responsive to a function of volt-amperes in an alternating-current circuit, a plurality of thermocouple units, each of said thermocouple units comprising a thermocouple element and a heater element electroconductively and thermoconductively connected to the associated thermocouple element, the elements in each of the units extending angularly relative to each other, said thermocouple elements being electroconductively connected to each other in a common direct-current output circuit, an alternating voltage source, an alternating current source, separate coupling means for coupling each of said heater elements for alternating energization from both of said sources, said coupling means being insulated from each other through said sources to block the flow of direct current between the coupling means through the sources.

26. In apparatus of the class described, responsive to a function of volt-amperes in an alternating-current circuit, first and second thermocouple units, each of said thermocouple units comprising a thermocouple element and a heater element electroconductively and thermoconductively connected to the associated thermocouple element, the elements in each of the units extending angularly relative to each other, said thermocouple elements being electroconductively connected to each other in a common direct-current output circuit, said thermocouple elements being connected in series in the output circuit with the thermocouple polarity of the first of the thermocouple units reversed relative to the polarity of the second of the thermocouple units, an alternating voltage source, an alternating current source, separate coupling means for coupling each of said heater elements for alternating energization from both of said sources, to provide a heater energization for the first of the thermocouple units proportional to the vector sum of the voltage and current of the voltage and current sources and to provide a heater energization for the second of the thermocouple units proportional to the vector difference of the voltage and current of the alternating voltage and current sources, said coupling means being insulated from each other through said sources to block the flow of direct current between the coupling means through the sources.

References Cited in the file of this patent

UNITED STATES PATENTS

| Number | Name | Date |
|---|---|---|
| 1,902,466 | Ratkovszky | Mar. 21, 1933 |
| 1,982,766 | Schrieber | Dec. 4, 1934 |
| 1,995,530 | Askey | Mar. 26, 1935 |
| 2,244,386 | Camilli | June 3, 1941 |
| 2,278,744 | Sparrow et al. | Apr. 7, 1942 |
| 2,283,566 | Miller | May 19, 1942 |
| 2,285,211 | Korman | June 2, 1942 |